United States Patent [19]

Voges

[11] Patent Number: 4,887,502
[45] Date of Patent: Dec. 19, 1989

[54] MACHINE FOR SLITTING METAL SHEET
[75] Inventor: Kenneth Voges, Red Bud, Ill.
[73] Assignee: Red Bud Industries, Inc., Red Bud, Ill.
[21] Appl. No.: 938,810
[22] Filed: Dec. 8, 1986
[51] Int. Cl.[4] .............................................. B23D 19/06
[52] U.S. Cl. ........................................ 83/479; 83/499; 83/425.4; 83/482; 83/659
[58] Field of Search ...................... 83/479, 499, 425.4, 83/482, 346, 348, 344, 659

[56]       References Cited
       U.S. PATENT DOCUMENTS

| | | | |
|---|---|---|---|
| 4,224,847 | 9/1980 | Tokuno | 83/499 X |
| 4,226,150 | 10/1980 | Reed | 83/346 |
| 4,254,677 | 3/1981 | Evans | 83/499 X |
| 4,507,996 | 4/1985 | Kesten | 83/344 |
| 4,604,934 | 8/1986 | Elliott et al. | 83/425.4 X |
| 4,684,360 | 8/1987 | Tokuno et al. | 83/425.4 X |

*Primary Examiner*—Donald R. Schran
*Attorney, Agent, or Firm*—Gravely, Lieder & Woodruff

[57]              ABSTRACT

A machine for slitting metal sheet has a bridge-type frame provided with upper and lower beams supported on posts. In the space between the two beams are upper and lower powered arbors and also upper and lower storage arbors which align respectively with the upper and lower powered arbors. Each powered arbor supports and turns several knives which are mounted on hubs along those arbors, and these knives when not needed may be moved, along with their hubs, onto the aligned storage arbors. Each knife is captured in a carriage which moves along one of the beams and contains back-up rollers which bear against the knife to prevent its arbor from deflecting under the spreading force exerted by the metal sheet as it is slit. The hubs have a wide stance, and accordingly the knives on them do not acquire a wobble when the hubs are secured on their respective arbors; yet notwithstanding the wide stance, the knives may be brought quite close together. The storage arbors normally support the ends of the powered arbors, but may be withdrawn to remove the knives from the arbors. The knives are positioned through a lead screw which drives a carriage having stops against which knives on the upper and lower arbors are moved. The carriage may also be provided with fingers that actually capture the knives of a pair and move them to the correct position.

32 Claims, 6 Drawing Sheets

MACHINE FOR SLITTING METAL SHEET

BACKGROUND OF THE INVENTION

This invention relates in general to metal cutting and more particularly to a machine for slitting metal sheet.

Much of the steel produced by mills is in the form of coiled steel sheet, but rarely does the sheet correspond in width to the multitude of products that are stamped or otherwise formed from it. Accordingly the steel sheet is usually slit longitudinally to sizes suitable for the particular products. Indeed, special slitting machines are made for this purpose.

The typical slitting machine has circular blades or knives arranged in pairs on two powered arbors, there being one knife of each pair on one of the arbors and the second knife of the pair on the other arbor. Actually each knife is nothing more than a hardened steel disk, perhaps about 10 inches in diameter and about ¼ to 2 inches thick. It has flat end faces and a cylindrical peripheral face which intersects the end faces at relatively sharp cutting or shearing edges. The disks of each pair are positioned on their respective arbors, often with a slight overlap. Overlap or not, the knives of each pair are positioned close enough to each other to enable them to cut or shear the metal sheet as it passes between those knives. In other words, the metal sheet passes between the two knives of a pair—and indeed is drawn between them—the disk-like knives shear the sheet along the opposite cutting edges, thus producing a clean longitudinal cut in the sheet. Not only are the disk-like knives arranged in pairs, but the pairs of knives are also usually organized into left and right hand configurations to prevent the longitudinal segments of the slit sheet from acquiring a twist or spiral upon emerging from the slitting machine. Thus, each arbor usually carries at least two and often more knives.

The knives, while being fixed firmly on their respective arbors during the operation of the machine, nevertheless may be removed for sharpening or may be repositioned so that the width of the segments slit may be varied. Setting the knives on the arbors of a slitting machine however is a tedious and time-consuming procedure, requiring a high degree of skill, for the knives must be located with considerable precision, not only to acquire the proper width for the cut, but to also maintain a clean high quality cut as well. Two types of arbors are commonly found in slitting machines of current manufacture—the slip type and the packed type.

The knives of a slip arbor are carried on hubs that slide over the arbor and are secured with set screws in the desired positions. In order to minimize deflection, the arbor must have a relatively large diameter. The hubs contain set screws which when turned down force clamping pads against the surface of the arbor to secure the knives firmly on the arbor. To set the knives of a pair in the proper position, the location of the cut desired from the pair of knives is usually located by measuring with a tape measure from reference point on the machine. One of the knives is then moved over its arbor to the point located with the tape measure and the set screw of its hub is turned down to secure the knife. Once the knife is so positioned, an indicator gage should be brought against it while the arbor is turned slowly. With the indicator gage the knife is checked for wobble and usually adjustments must be made by loosening the set screws and tapping the knife lightly to eliminate the wobble. The same procedure is then repeated with the other knife of the pair, only its location is determined from the location of the previous knife, there usually being an axial gap on the order of 7 to 10 percent of the thickness of the metal sheet between the opposite cutting edges of the two knives.

On a packed arbor spacers separate the knives. These spacers are large enough and are machined with enough precision to eliminate the wobble inherent with conventional slip arbors, but present complexities in the selection of spacers and shims to properly locate the knives. Indeed, the entire arbor is usually removed from the machine and placed in a setup stand to install its complement of knives and spacers for any particular slitting job, and this in itself is a difficult procedure. Moreover, the selection of spacers and shims requires a considerable amount of skill. Furthermore, the spacers must be handled carefully, lest they may acquire knicks that will skew the knives and create a wobble as they rotate.

With both slip arbor and packed arbor machines the knives are usually handled apart from the arbor during loading and unloading, and if a knife is not needed for a particular slitting operation, it must be stored separately from the machine. This is somewhat inconvenient and increases the set up time.

DESCRIPTION OF THE DRAWINGS

In the accompanying drawings which form part of the specification and wherein like numerals and letters refer to like parts wherever they occur—

DETAILED DESCRIPTION

Figure 1:
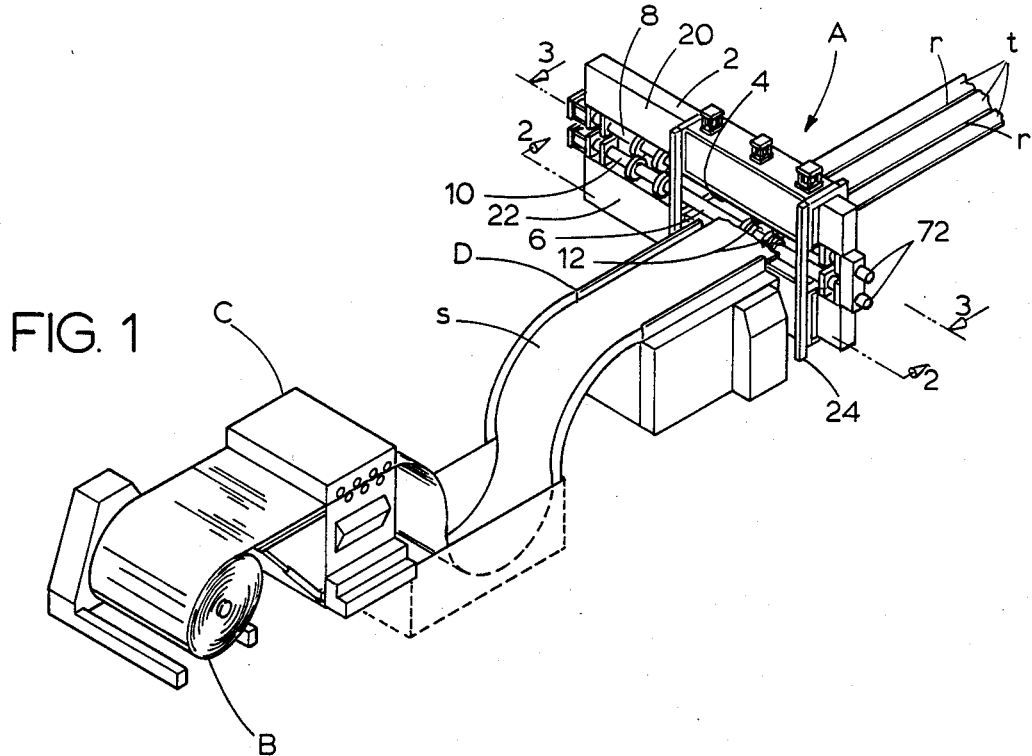
FIG. 1 is a perspective view showing the slitting machine of the present invention along with the sheet metal that is slit and other components used in conjunction with the machine.

Referring now to the drawings (FIG. 1), A designates a slitting machine for shearing metal sheet s, such as sheet steel, into multiple segments t of desired width along slits r. The metal sheet s is normally acquired from a mill or other supplier of mill products in a coil B. In order to slit the metal sheet s in the machine A, the sheet s is withdrawn from the coil B and is usually passed through a straightening machine C to remove the coil set. The straightened sheet s then passes through feeding apparatus D which measures the length of the sheet s passing through it and guides the sheet s into the machine A. The sheet s may also be fed into the machine A in individual sections preferably with the assistance of a skewed roller table.

The slitting machine A basically includes a frame 2 (FIGS. 1-4), upper and lower powered arbors 4 and 6 (FIGS. 2 & 3) which are mounted on the frame 2; upper and lower storage arbors 8 and 10 (FIGS. 2 & 3) which are also mounted on the frame 2 and further align axially with the upper and lower powered arbors 4 and 6, respectively; circular cutters 12 (FIGS. 2, 3, & 6-8) which may be moved between the powered arbors 4 and 6 and their respective storage arbors 8 and 10, and when on the former serve to slit the metal sheet s; carriages 14 (FIGS. 2, 3 & 8) which are located on the frame 2 and serve to back the cutters 12 to prevent the arbors 4 and 6 from deflecting; and a positioning unit 16 (FIGS. 5, 9 & 10) which locates the cutters 12 and their respective carriages 14 in the correct positions along the powered arbors 4 and 6.

Turning now to the frame 2 (FIGS. 2-4), it possesses a bridge-type construction, in that it is formed from upper and lower beams 20 and 22 which are supported on four posts 24 that extend upwardly from a supporting surface, such as a floor, on which they rest. The two beams 20 and 22 are horizontal and parallel, with one being directly above the other. Each possesses a boxlike construction. A space exists between the two beams 20 and 22, and within this space are the upper and lower powered arbors 4 and 6 as well as the upper and lower storage arbors 8 and 10. The cutters 12, being on the arbors 4 and 6 or 8 and 10, are likewise located in the space, and the same holds true as to the carriages 14 which follow the cutters 12. The posts 24 are arranged in pairs with the two beams 20 and 24 being interposed between the posts 24 of each pair, and thus the posts 24 constitute connecting members between the beams 20 and 22. Moreover, the posts 24 of one pair are located near the one end of each of the beams 20 and 22, while the posts 24 of the other pair are set somewhat inwardly from the opposite ends of those beams 20 and 22. Indeed, the latter posts 24 are located approximately where the powered arbors 4 and 6 meet and align with the storage arbors 8 and 10 so the portions of the beams 20 and 22 along which the storage arbors 8 and 10 are located are cantilevered beyond the posts 24. The two beams 20 and 22 and the two sets of posts 24 create within the frame 2 an opening through which the metal sheet s passes as it is slit, with the posts 24 being presented toward the edges of the sheet s.

Figure 3:
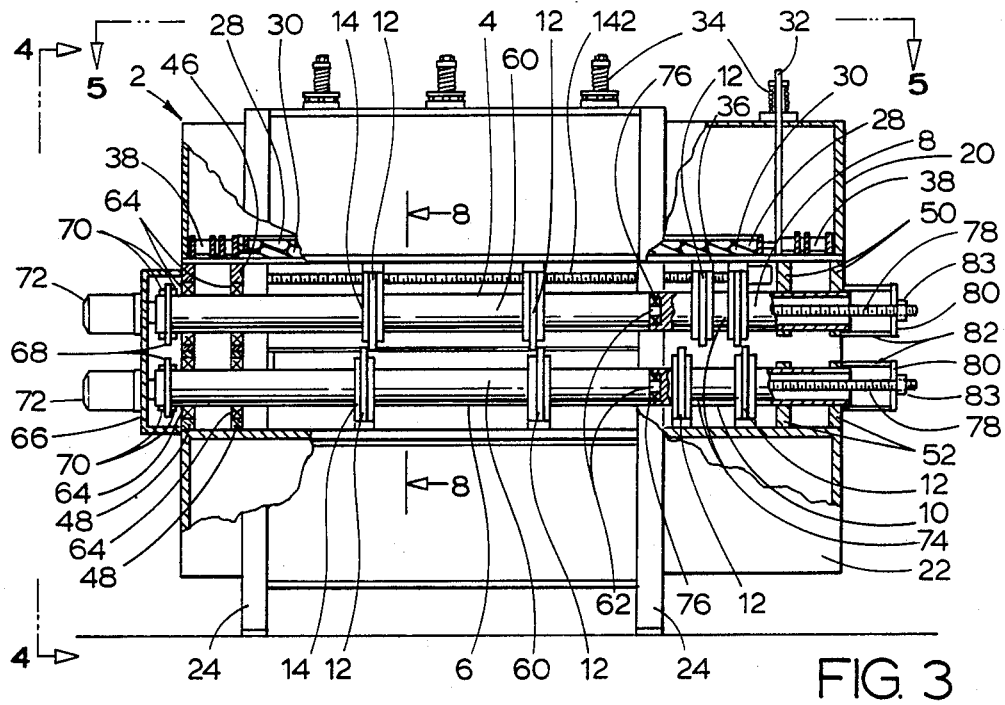
FIG. 3 is an elevational view partially broken away and in section taken along line 3—3 of FIG. 1 and showing the discharge side of the machine.
Figure 4:
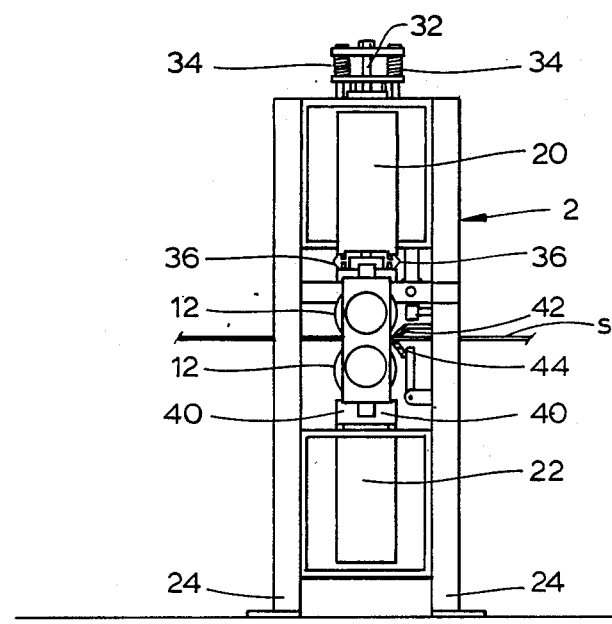
FIG. 4 is an end elevational view taken along line 4—4 of FIG. 3.
Figure 5:
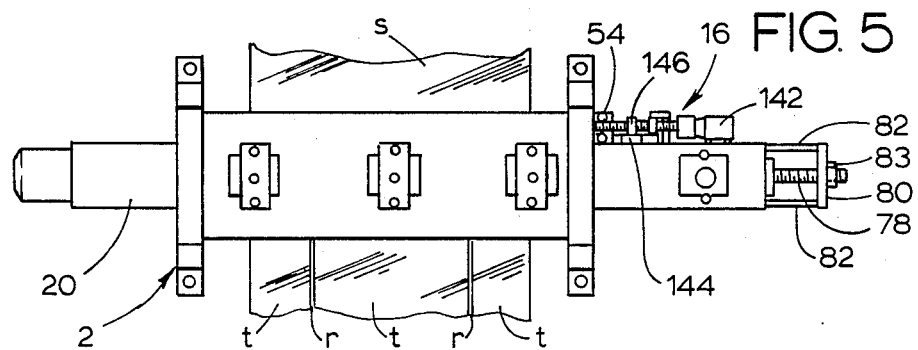
FIG. 5 is a plan view of the machine taken along line 5—5 of FIG. 3.
Figure 6:
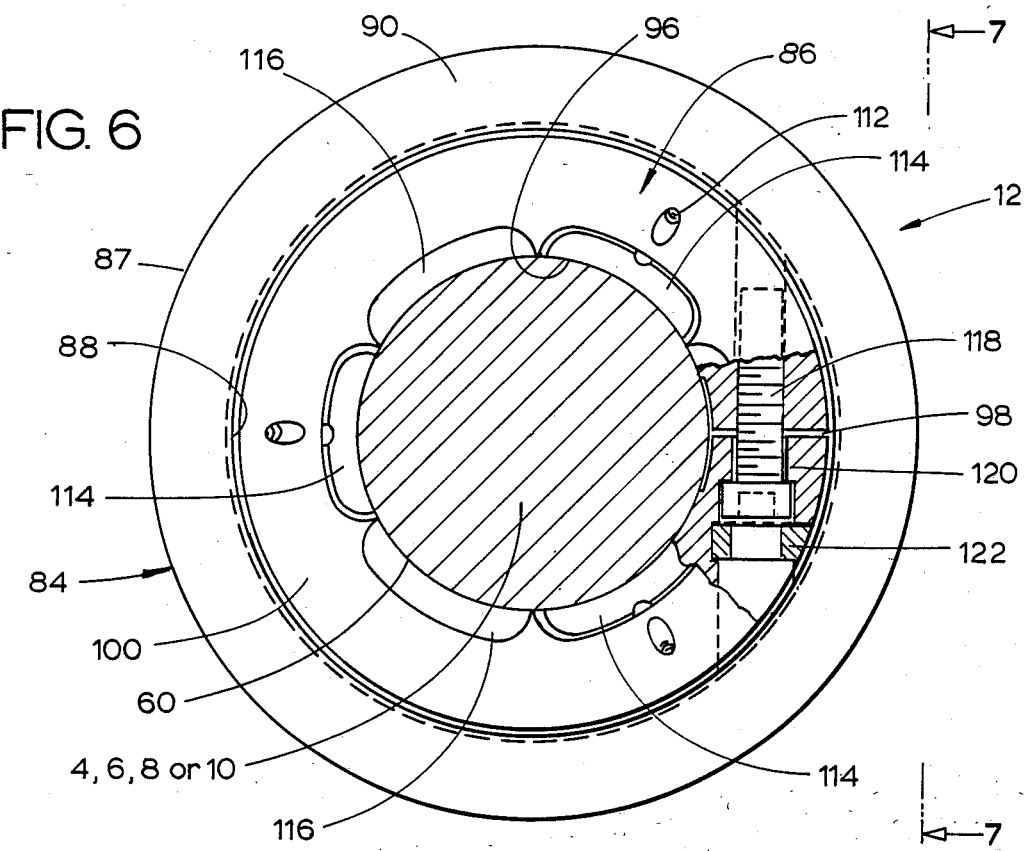
FIG. 6 is an end elevational view partially broken away and in section of a cutter used on the arbors of the machine.
Figure 7:
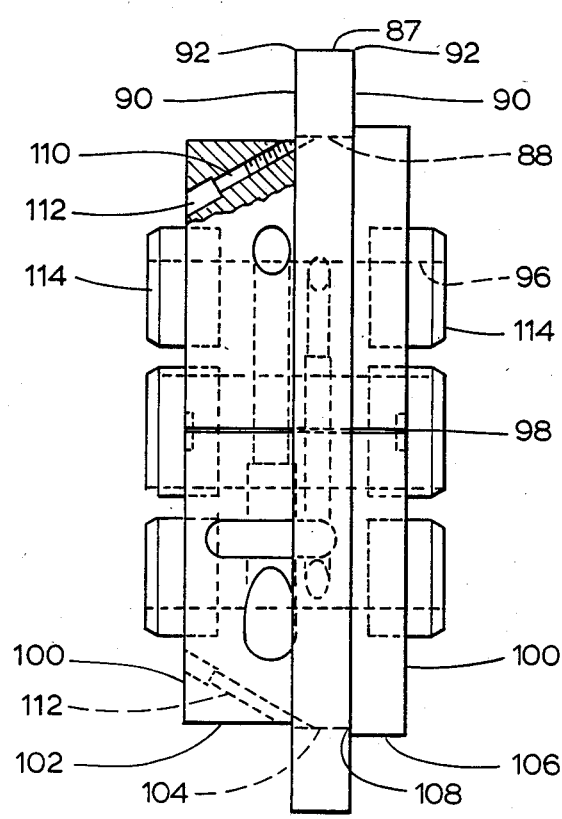
FIG. 7 is a side elevational view of the cutter taken along line 7—7 of FIG. 6.

Along its bottom, the upper beam 20 has upper camming bars 28 (FIG. 3) provided with a succession of inclined camming surfaces that are presented downwardly. Each camming surface is at the same angle and elevation, giving the bars 28 a saw tooth profile. The upper camming bars 28 mate with lower camming bars 30 which likewise have a succession of inclined camming surfaces arranged at the same angle and spacing as the camming surfaces of the upper bars 28, and indeed the upper and lower camming bars 28 and 30 abut along their inclined camming surfaces. The lower camming bars 30 are held against the upper camming bars 28, and the upper camming bars 28 are held against the bottom of the upper beam 20 by tie rods 32 which are attached to the lower bar 30 and extend upwardly through the hollow interior of the upper beam 20. Each tie rod 32 at its upper end is fitted with a cross piece 33 that projects laterally in both directions from the rod 32, and on each side of the rod 32, the cross piece 33 is urged upwardly by a coil-type compression spring 34 (FIG. 4).

The lower camming bar 30 carries a pair of tracks 36 (FIGS. 3 & 8) which project laterally toward each other to form a horizontal way along the bottom of the upper beam 20. The tracks 36 in turn support the carriages 14 of the upper arbors 4 and 8 and enable those carriages to be positioned at any location along the aligned arbors 4 and 8 to which the cutters 12 that they capture are moved, assuming of course that the cutters 12 are released from the arbors 4 and 8.

Along the bottom of the upper beam 30 at the ends of the upper camming bars 28 are hydraulic cylinders 38 (FIG. 3), the rods of which bear against the ends of the camming bars 28. Indeed, the cylinders 38 when energized move the upper bars 28 longitudinally, the one forcing the bars 28 in one direction and the other in the opposite direction. Of course, as the upper bars 28 move, their camming surfaces move over the corresponding camming surfaces on the lower bars 30 and thus changing the elevation of the rails 36. Depending on which cylinder 38 is energized, the tracks 36 will either rise or descend, but in any event the springs 34 acting through the tie rods 32 keep the inclined camming surfaces of the two bars 28 and 30 together. Moreover, once the tracks 36 are in the desired position, the hydraulic lines leading to the cylinders 38 are blocked so as to hold the upper bars 28 in a fixed position longitudinally. The bars 28 then serve as a solid backing for the lower bars 30, and of course for the tracks 36 as well. Thus, the tracks 36 may be placed at varying elevations within the limits afforded by the inclined camming surfaces on the camming bars 28 and 30, and in each elevation they will be solidly positioned so as to withstand substantial upwardly directed forces, at least in the region directly above the powered arbor 4.

The lower beam 22 along its top is provided with tracks 40 (FIGS. 3 & 8) which project toward each other and extend along the beam 22 for substantially its full length to form another horizontal way. Whereas the tracks 36 on the upper beam 20 are adjustable upwardly and downwardly, the tracks 40 on the lower beam 22 are attached solidly to the beam 22 and remain fixed in position with respect to that beam. The tracks 40 on the lower beam 22 support the carriages 14 that are along the lower arbors 6 and 10 and enable those carriages to be positioned anywhere along the aligned arbors 6 and 10, once the cutters 12 which they capture are released from the arbors 6 and 10.

In the region between the two posts 24 that are presented toward the feeding apparatus D through which the sheet s moves as it passes into the machine A, the frame 2 is fitted with upper and lower guide plates 42 and 44 (FIG. 4), respectively, which are spaced apart to receive the sheet s and direct it into the space between the two powered arbors 4 and 6. The lower plate 44 is actually attached to a pair of bell cranks which pivot on the frame 2 under the force exerted by pneumatic cylinders so that the elevation of the lower plate 44 may be varied.

At one end of the frame 2, that is at the end where two of the posts 24 are located, the lower camming bar 30 of the upper beam 20 at that end has a mounting block 46 (FIG. 2) attached to and projecting downwardly from it for supporting the upper arbor 4. Likewise, in the same region the lower beam 22 is fitted with another mounting block 48 to which the lower arbor 6 is secured. The two mounting blocks 46 and 48 occupy those short portions of their respective beams 20 and 22 which project beyond the posts 24.

Along the opposite cantilevered section of the upper beam 20, the lower camming bar 30 of the upper beam 20 is fitted with a clamping block 50 (FIG. 2) in which the upper storage arbor 8 is received and indeed captured. Likewise the cantilevered portion of the lower beam 22 is provided with a clamping block 52 which holds the lower storage arbor 10. The two clamping blocks 50 and 52 are located at the very ends of their respective beams 20 and 22, so that the storage arbors 8 and 10 project horizontally from those blocks toward the powered arbors 4 and 6 with which they align.

Figure 2:
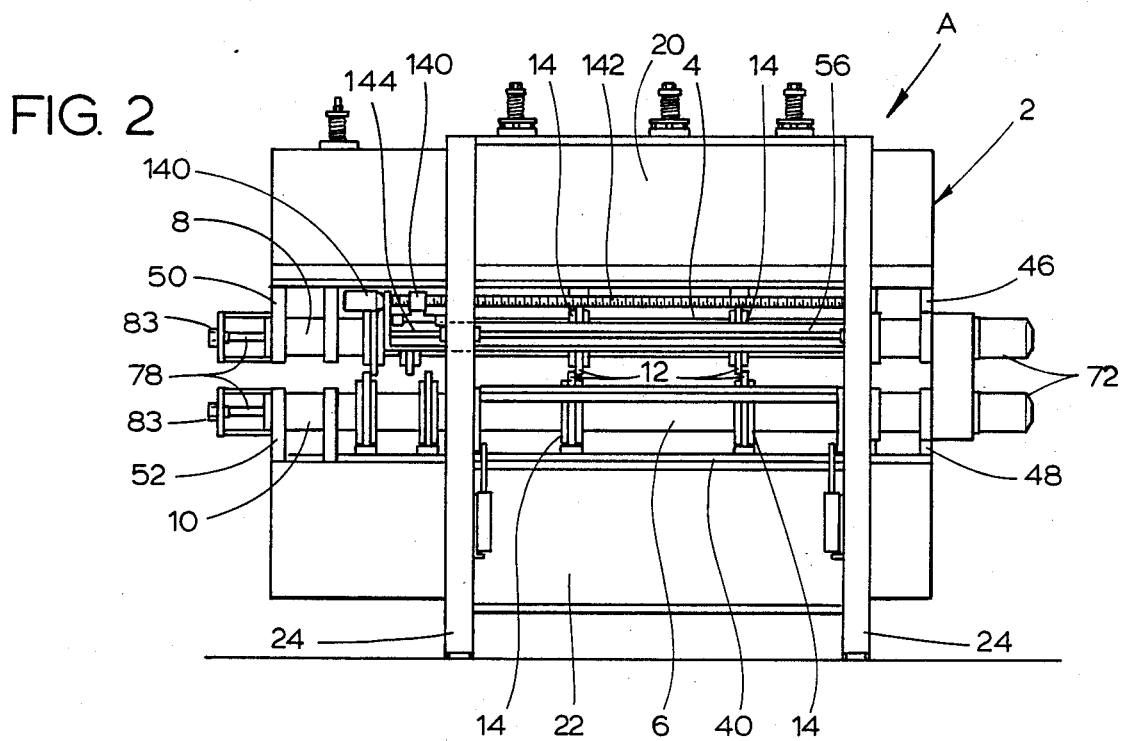
FIG. 2 is an elevational view taken along line 2—2 of FIG. 1 and showing the feed side of the machine.
Figure 9:
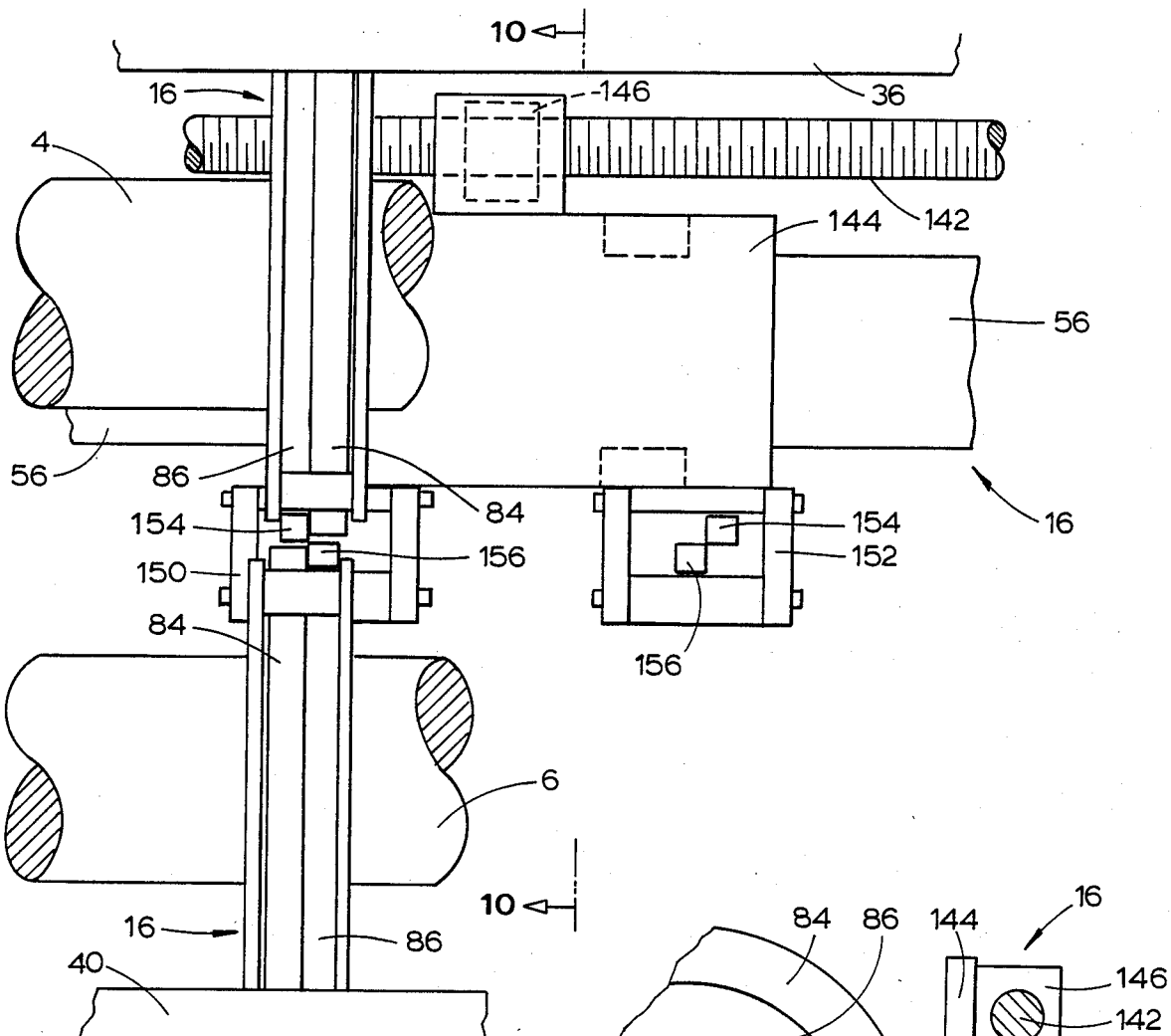
FIG. 9 is a side elevational view of the positioning unit used to locate the cutters on their respective arbors.
Figure 10:
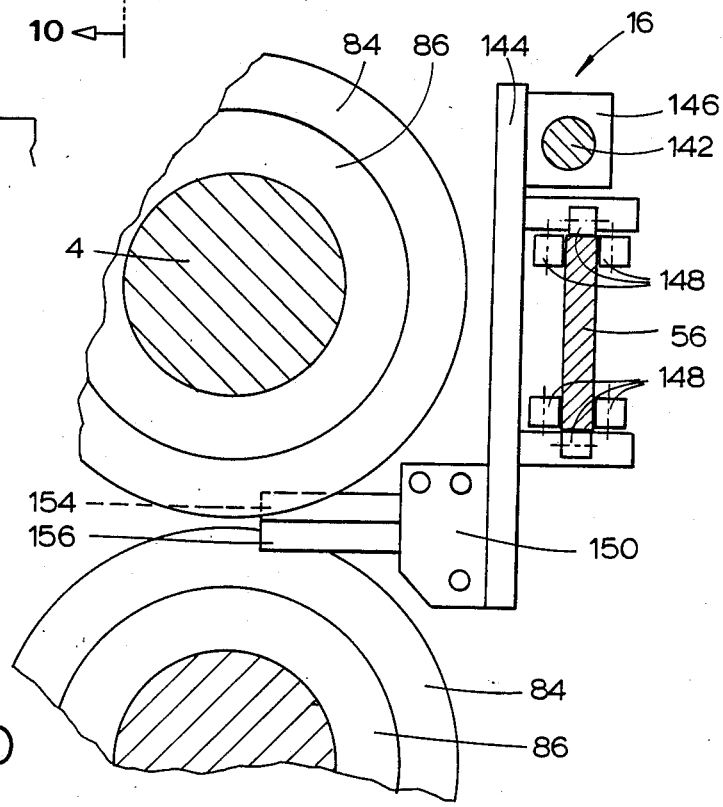
FIG. 10 is an end elevational view of the positioning unit taken along line 10—10 of FIG. 9.

Finally, that post 24 which is presented toward the table D at the cantilevered ends of the beams 20 and 22 is fitted with a bracket 54 (FIG. 5) from which the positioning unit 16 is to a large measure suspended, while the two posts 24 on that side of the machine A support a guide rail 56 (FIGS. 2, 9 & 10).

Each powered arbor 4 and 6 includes a cylindrical shaft surface 60 (FIG. 3) which is finely machined, preferably by grinding on centers, and electroplated with chromium to provide a truly cylindrical configuration of perhaps 4½ or 5 inches diameter. The arbors 4 and 6 are solid throughout, and each at one end is provided with a short spindle 62 of a somewhat lesser diameter, perhaps on the order of 3 inches. The spindles 62 project toward and into the aligned storage arbors 8 and 10. The opposite ends of the arbors 4 and 6 are received radial bearings 64 which are captured in the mounting blocks 46 and 48. The upper mounting block 46 and the radial bearings 64 within it possess enough rigidity to support the entire arbor 4 when that arbor is totally free of cutters 12 and detached from its aligned storage arbor 8. Likewise, the lower mounting block 48 and its bearings 64 will support the lower arbor 6 in a cantilevered condition. Beyond their outermost radial bearings 64, the arbors 4 and 6 are enclosed within a housing 66, and here the arbors 4 and 6 are fitted with disks 68 that rotate within the housing 66. On each side of their disks 68 the arbors 4 and 6 have thrust bearings 70 which hold the arbors 4 and 6 in fixed axial positions while allowing them to rotate.

That rotation is provided by hydraulic motors 72 (FIG. 3) which are mounted beyond the housings 66 and have their rotors coupled to the arbors 4 and 6. The motors 72 for the two arbors 4 and 6 rotate the arbors 4 and 6 in opposite directions and those directions are such that the cylindrical surfaces 60 come toward each other on that side of the machine A which is presented toward the feeding apparatus D—obviously to enable the cutters 12 to slit the metal sheet s.

Each of the storage arbors 8 and 10 has a cylindrical outer surface 74 (FIG. 3) which, like the shaft surfaces 60 of the powered arbors 4 and 6, is finely machined to precisely the same diameter as the outside cylindrical surfaces 60 of the aligned powered arbor 4 or 6. Again the surface 74 preferably should be ground on centers. At one end the upper storage arbor 8 is secured to the clamping block 50, from which it projects toward the free end of the upper powered arbor 4. Likewise the lower storage arbor 10 is clamped at one end in the clamping block 52 from which it projects toward the lower powered arbor 6. In this regard, the clamping blocks 50 and 52 have upper and lower segments, each of which possesses a semicircular clamping surface, and these segments are held together with machine screws which pass through one of the segments and thread into the other. Of course, when the machine screws for the blocks 50 and 52 are threaded down against the segments through which they pass, the storage arbors 6 and 8 are secured firmly by their respective clamping blocks 52. On the other hand, when the screws 75 are backed off slightly, the arbors 8 and 10 may be moved in the axial direction to separate them from the powered arbors 4 and 6 with which it aligns.

At their opposite or free ends the storage arbors 8 and 10 have radial bearings 76 (FIG. 3), the inner races of which are large enough to receive the spindles 62 on the aligned powered arbors 4 and 6. Indeed, when the spindles 62 of the powered arbors 4 and 6 are within the bearings 76 of the storage arbors 8 and 10, the free ends of the powered arbors 4 and 6 are supported by the shorter storage arbors 8 and 10, yet the powered arbors 4 and 6 can turn relative to the fixed storage arbors 8 and 10. Moreover, the cylindrical outer surfaces 60 and 74 of the two upper arbors 4 and 8 and the lower arbors 6 and 10 align precisely, so that cutters 12 may be moved between the aligned arbors 4 and 8 and the aligned arbors 6 and 10.

Connected with each storage arbor 8 and 10 so as to rotate relative to it is a bolt 78 (FIGS. 3 & 5) that projects axially out of and beyond the outer end of that arbor. Indeed, the bolts 78 of the two arbors 8 and 10 extend through plates 80 which are attached to struts 82 that project from the clamping blocks 50 and 52. Moreover, each plate 80 has attached firmly to it a nut 83 through which the bolt 78 for that plate 80 threads. When the bolts 78 are turned in the proper direction, the storage arbors 8 and 10 to which they are connected will withdraw from the aligned powered arbors 4 and 6, assuming of course that the clamping blocks 50 or 52 are loosened somewhat. By turning the bolts 78, the two storage arbors 8 and 10 may be backed far enough away from their corresponding powered arbors 4 and 6 to pass the cutters 12 between the ends of the separated arbors 4 and 8 and the separated arbors 6 and 10, so that the cutters 12 may be loaded on and removed from the storage arbors 8 and 10.

Each cuter 12 includes (FIGS. 6 & 7) an annular knife 84 and a hub 86 which the knife 84 encircles. The hub 86 in turn surrounds the arbor 4, 6, 8, or 10 on which the cutter 12 is mounted. Thus, the hub 86 serves as a mount for the knife 84 and is in effect interposed between the knife 86 and one of the arbors 4, 6, 8 or 10.

The knives 84 (FIGS. 6 & 7) are formed from tool steel, so that they will hold a cutting edge. In configuration, each knife 12 is nothing more than an annulus having a cylindrical outer surface 87, a cylindrical inner surface 88, and flat end faces 90 which are perpendicular to the center axis of the knife 12. The flat end faces 90 intersect the cylindrical outer surface 86 along circular cutting edges 92, but usually only one of the cutting edges 92 is used at a time. While the knife 84 will fit around any one of the arbors 4, 6, 8, and 10, its cylindrical inner surface is in terms of diameter considerably larger than the cylindrical surfaces 60 and 74 of those arbors.

Each knife 84 encircles and is carried on a hub 86 (FIGS. 6 & 7) which serves as a mount for it. The hub 86, like the knife 84 that it carries, is a ring having a cylindrical inner surface 96, but the hub 86 instead of being solid and continuous circumferentially, has a radial slit 98 which enables it to expand or contract. This permits the diameter of the inner surface 96, which is normally the same as the diameter of the arbors 4, 6, 8, and 10, to change slightly so as to facilitate moving the hub 86 along one of the cylindrical arbor surfaces 60 and 74 and clamping it in the position desired on the cylindrical surface 60 of one of the powered arbors 4 and 6. The hub 86 has flat end faces 100, which are spaced somewhat farther apart than the end faces 90 of the knife 12; and its outwardly presented surface is composed of three cylindrical surfaces of progressively greater diameter, there being a relatively wide approach surface 102, a narrower seating surface 104, and a rib surface 106, arranged in that order from one end surface 100 to the other. The diameter of the seating surface 104 is only slightly less than the diameter of the cylindrical inner surface 88 of the knife 84 and is about the same width, so that the knife 84 fits over the seating surface 104. The rib surface 106 creates a shoulder 108 along one side of the seating surface 104, and the knife 84 abuts the shoulder 108 when installed on the hub 94. When the knife 84 is so positioned, its axis is parallel to and indeed coincides with the axis of the hub 86, so the knife 84 will not wobble when the hub 86 rotates about its axis. The knife 84 is retained on the hub 86 by set screws 110 which thread through holes 112 extended obliquely through the hub 94 from that end face 100 which intersects the approach surface 102 to the seating surface 104. When turned down, the screws 110 bear against the cylindrical inner surface 88 of the knife 84, thereby securing the knife 84 against rotation relative to the hub 86 and further driving it firmly against the shoulder 108 along the rib surface 106.

In addition, the hub 86 at each of its end faces 100 has three stabilizing bosses 114 which project axially and are arranged at 120° intervals around the cylindrical inner surface 96. Indeed, the cylindrical inner surface 96 continues through and exists along the bosses 114, although it is interrupted in the region between the bosses 114. On its outside face each boss 114 is slightly beveled at its end. Moreover, each boss 114 occupies no more than 60° of the circumference of the hub 84. Between the bosses 114 are cavities 116 of corresponding configuration which open out of the flat end face 100 from which the bosses 114 project.

The bosses 114 increase the stance of the hub 86 and the knife 84 which is carried by it, so that in spite of the lesser diameter of the arbors 4 and 6, when compared with arbors of conventional slitting machines, the knife 84 is not inclined to wobble. The cavities 116, on the other hand, receive the bosses 114 of adjacent hubs 94, so that the hubs 86 may, if necessary, be brought together with their end faces 100 almost abutting despite the wide stance of those hubs 86. Thus, the slits r in the sheet s may be made relatively close together.

The hub 86 is expanded and contracted by a machine screw 118 (FIG. 6) which traverses the radial slit 98, it being threaded into the hub 84 on one side of the slit 98 and loosely received in a hole 120 on the other side. Indeed, the head of the screw 118 is within the hole 120, and a small retaining plate 122 fits into the hub 86 over the head of the screw 118, so as to partially block the hole 120 and prevent the screw 118 from being backed out of the hole 120. Nevertheless, the plate 122 does not totally obscure the head which is provided with a hexagonal socket into which a wrench may be inserted for turning the screw 118. When the machine screw 118 is tightened, it clamps the hub 86 securely against the cylindrical surface 60 on that powered arbor 4 or 6 on which it is located, so the cutter 12 and its knife 84 will turn with that arbor. On the other hand, when the screw 118 is backed off against the retaining plate 122, it will expand the hub 86, so the hub 86 will slide easily over the cylindrical surface 60 of the powered arbor 4 or 6 as well as over the cylindrical surface 74 of the storage arbor 8 or 10 with which powered arbor 4 or 6 aligns.

Figure 8:
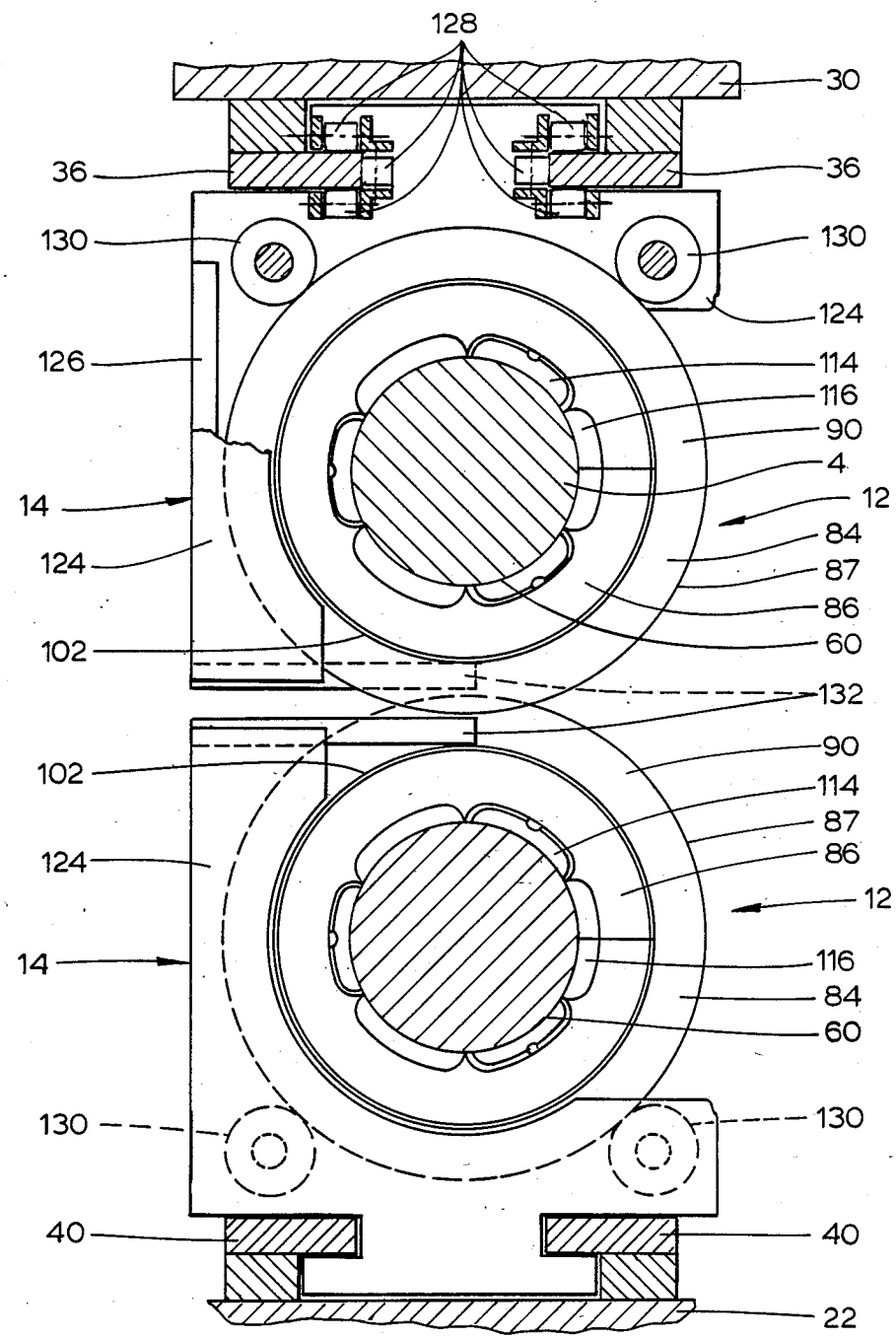
FIG. 8 is a sectional view of the machine taken along line 8—8 of FIG. 3 and showing the cutters and their carriages with one of the carriages being partially broken away.

When used for slitting, the knives 84 are employed in pairs, there being one knife 84 of a pair on the upper powered arbor 4 and the other knife of the pair on the lower powered arbor 6. The knives 84 of a pair do not align, but instead are offset slightly so that the active cutting edge 92 for the upper knife 84 is spaced axially a slight distance from the active cutting edge 92 for the lower knife 84 (FIG. 8). That spacing should range between 7 and 10 percent of the thickness of the sheet s. The lower portion of the cutting edge 92 for the upper knife 84 may project below the upper portion of the cutting edge 92 for the upper knife 84 as much as 0.020 inches or instead of this overlap, the knives may be spaced apart, perhaps as much as 0.060 inches. The vertical positioning of the knives 84 depends on the thickness of the metal sheet s and is such that when the metal sheet s passes between the knives 84 of a pair, the upper knife 84 forces it downwardly while the closely spaced lower knife 84 forces it upwardly, and as a consequence the sheet s is sheared or slit at the axial clearance between the two knives 84. Not only are the cutters 12 and their knives 84 arranged in pairs, but the pairs are arranged in right and left hand configurations which alternate along the upper arbors 4 and 8 and the lower arbors 6 and 10 (FIGS. 2 & 3). In the right hand configuration the upper knife 84 of a pair is offset to the right of the lower knife 84, whereas in the left hand configuration the upper knife 84 is to the left. Inasmuch as the configurations alternate, the twist imparted to the sheet s by one pair of knives 84 is counteracted by the twist imparted by the adjacent pair of knives 84.

Each knife 84 revolves or is otherwise contained within one of the carriages 14 (FIG. 8) which serves to deflect the slit metal sheet s, or more accurately the segments t, out of the space between the two beams 20 and 22, and further serves as a backing for the knives 84 so that the substantial force imparted to it by the metal sheet s does not significantly deflect the powered arbor 4 or 6 on which it revolves. Indeed, the carriages 14 follow the tracks 36 and 40 of the upper and lower beams 20 and 22 and transfer the spreading force imparted by the metal sheet s to the beams 20 and 22, so that little of that force is resisted by the arbors 4 and 6.

Each carriage 14 includes spaced apart side plates 124 that are generally L-shaped in configuration and are separated by spacers 126 which are only slightly wider than the width of the knife, since once side plate 124 is located opposite one of the flat end faces 90 of the knife 12, while the other is located opposite the other end face 90. One leg of each L-shaped side plate extends horizontally between the pair of tracks 36 or the pair of tracks 40 at which the knife 84 is located, while the other extends vertically on the discharge side of the machine A, that is the side which is presented away from the feeding apparatus D. Actually, the inside edges of the two side plates 124 are arcuate, with the inside edge of the one following the contour of the approach surface 102 on the hub 86 and the other following the contour of the rib surface 106. The horizontal legs that traverse the two tracks 36 or 40 further project into the space between those tracks. Between the horizontal legs are short axles which carry support rollers 128 that roll on both the top surface and the bottom surfaces and the inside edges of the tracks 36 or 40 along which the carriage 14 is located. Outwardly from the support rollers 128 are more axles which span the space between the two side plates 124, and these axles serve as journals for back-up rollers 130 that bear against the cylindrical outer surface 87 of the knife 84 that is captured between the two side plates 124. Thus, the spreading force applied to any pair of knives 84 by the metal sheet s as those knives 12 shear the sheet s is to a large measure transferred to back-up rollers 130 and thence through the side plates 124 and support rollers 128 to the tracks 36 and 40 and the beams 20 and 22 along which those tracks 36 and 40 are located.

The spacer 126 between the ends of the vertical legs for two side plates 124 has a stripper blade 132 (FIG. 8) attached to it, and that blade projects laterally along that end face 90 of the knife 84 at which the actual cutting edge 92 exists and at its end rides on the approach surface 102 of the hub 86. As such, the stripper blade 132 is located directly opposite the cylindrical outer surface 86 of the other knife 84 for the pair. That knife will deflect the sheet s, once it is slit, against the stripper blade 132 which in turn directs it laterally so that it passes out of the discharge side of the machine A without following the circular contour of the other knife 84.

The positioning unit 16 provides a reference for locating the knives 84 of any pair in the proper location along their respective upper and lower powered arbors 4 and 6. It includes (FIGS. 2, 5, 9, & 10) a reversible hydraulic motor 140 which is mounted on the frame bracket 54 and powers a lead screw 142 which extends along the frame 2 generally behind upper powered arbor 4 and rail 56, its axis being parallel to the axes of the arbors 4, 6, 8, and 10. Moreover, the lead screw 142 extends somewhat in excess of the full length of the two powered arbors 4 and 6, with one end being connected to and supported by the motor 140 and the other end being in a bearing located on the post 24 remote from the bracket 54 on which the motor 140 is carried. The lead screw 142 is monitored through an electronic device which controls the operation of the motor 140.

In addition, the positioning unit 16 includes a carriage 144 (FIGS. 9 & 10) to which is attached a nut 146 that is engaged with the lead screw 142, so that the nut 146 and carriage 144 move along the screw 142 as it turns. The carriage 144 for the most part is located along the rail 56 and here it is provided with a series of guide rollers 148 which roll along the front and back surfaces of the rail 56 at both the upper and lower edges and additional guide rollers 148 which roll along the upper and lower edges themselves. The rollers 148 are arranged to impart considerable stability to the carriage 144 in both the vertical and lateral directions, yet allow the carriage 144 to move longitudinally along the rail 56 parallel to the lead screw 142 and the arbors 4 and 6.

The carriage 144 projects below the rail 56 into the region directly behind nips between the knives 84 of the several pairs, and here two locator housings 150 and 152 are fastened securely to the carriage 144. Each housing 150 and 152 is set back far enough to clear the knives 12 and their carriages 14 as the carriage 144 moves along the lead screw 142. Each, however, carries a pair of stops 154 and 156 which are normally contained within the housing 150 or 152, but may be extended from it along the end faces 90 of the knives 84. Actually, the upper stop 154 is located high enough to project over the lower knife 84 of a pair so that the upper knife 84 of the pair, at that end face along which its active cutting edge 92 exists, may be brought against the side of the stop 154. The lower stop 156, on the other hand, is low enough to project under the upper knife 84 of the same pair, so that the lower knife 84, at that end face 90 along which its active cutting edge 92 exists, may be brought against the side of the lower stop 156. In that manner the two knives 84 of the pair are positioned at the proper locations on their respective arbors 4 and 6 with the proper spacing between them. The stops 154 and 156 of the locator housing 150 are arranged to accommodate a pair of knives 84 in the right hand configuration, whereas the stops 154 and 156 of the housing 152 are arranged to accommodate a pair of knives 84 in the left hand configuration.

With thicker metal sheets s the axial offset between the active cutting edges 92 of a pair of knives 84 should be somewhat greater than with thinner sheets s, and to accommodate variances in the thickness of sheet s consigned for slitting, the stops 154 and 156 may have stepped side faces that bear against the end faces 90 of the knives 84. In that case, the device which extends the stops 154 and 156 must be able to project incrementally so as to locate those surfaces or steps which are proper for the particular sheet s opposite the end faces 90 of the knives 84.

OPERATION

Relatively little effort and time is required to set the slitting machine A for operation, but obviously the desired location for the slits r in the sheet s must be known. The same holds true for thickness of the sheet s, because that thickness determines the vertical overlap or separation of the knives 84 and the axial offset between the active cutting edges 92 for the knives 84 of each pair.

Initially the upper arbors 4 and 8 are backed as far as possible away from the lower arbors 6 and 10 so that no vertical overlap or penetration exists between the knives 84 on the arbors 4 and 6. This is achieved by energizing the cylinders 38 at the ends of the upper beam 20 to shift the upper camming bar 28 relative to the lower camming bar 30 in the direction which allows the spring 34 to elevate the upper arbors 4 and 8.

To position the knives 84 along their respective arbors 4 and 6, the hubs 86 on which those knives are mounted must of course be free to move along the arbors 4 and 6, and this requires backing off the machine screws 118 which clamp the hubs 86 around the arbors 4 and 6. This is achieved by merely inserting a wrench of hexagonal cross-section into the hole 120 of each hub 94, engaging the head of the screw 118 that is within the hub 94, and turning the screw 118 counterclockwise a turn or two. Next the knives 84 are moved in pairs manually over the arbors 4 and 6 to approximately the locations they will assume in the actual slitting operation. This may require moving some cutters 12 and their carriages 14 off of the storage arbors 8 and 10 and onto the powered arbors 4 and 6, or vice-versa. In any event, once the knives 84 are located in approximately the positions they will assume, the positioning unit 16 is called upon to precisely locate them.

To this end, the location for the first pair of knives is entered into the control device for the positioning unit 16, and it energizes the hydraulic motor 140 which turns the lead screw 142 precisely the number of revolutions required to bring the stops 154 and 156 of one of the housings 150 or 152 to the location at which the knives 84 should be secured, and of course the housing 150 or 152 that is selected should have its stops arranged to match the configuration of the pair of knives 84 which are to be located. For example, if the knives 84 of the pair are in the right hand configuration, then the stops 154 and 156 of the housing 150 are employed. Of course, as the carriage 144 moves along the rail 56, the stops 154 and 156 of the two housings 150 and 152 are retracted so that they do not snag on knives 84 that may be along the arbors 4 and 6. Once the stops 154 and 156 of the proper configuration are positioned at the location selected for the pair of knives 84 under consideration, the stops 154 and 156 are projected from their housing 150 or 152. The upper stop 154 locates generally above the cylindrical outer surface 86 on the lower knife 84 of the pair, whereas the lower stop 156 is generally below the cylindrical outer surface 86 on the upper knife 84. Next the upper knife 84 is moved manually over the upper arbor 4 until the end face 90 along which its active cutting edge 92 exists is against the side of the upper stop 154. Similarly, the lower knife 84 is moved in the opposite direction over its arbor 6 until the end face 90 along which its active cutting edge 92 exists is against the side of the lower stop 156. When the end faces 90 of the upper and lower knives 84 of the pair abut the upper and lower stops 154 and 156, the two knives 84 are in the proper positions in the machine A and further are spaced the correct distance apart. To secure the knives 84, a wrench is inserted into the hole 120 for the hub 94 on which each knife 84 is carried and engaged with the machine screw 118 within that hole. The screws 118 are turned down to contract their respective hubs 86 and clamp them tightly to the arbors 4 and 6.

The pairs of knives 84 for the remaining slits r are positioned on the arbors 4 and 6 in the same manner. If the pairs of knives 84 available exceed the number of slits r scheduled for the sheet s, the cutters 12 and carriages 14 for those knives 84 which are not required are moved manually to the storage arbors 8 and 10.

Once the knives 84 are properly located on their respective arbors 4 and 6, the upper arbor 4 is set to provide the proper vertical penetration or separation. To this end, the cylinders 38 at the ends of the upper beam 20 are energized to drive the upper camming bar 28 over the lower camming bar 30 and thereby depress the upper arbors 4 and 8 and their carriages 14 to the proper elevation.

After the machine A is properly set up, the leading edge of the metal sheet s is advanced over the table D and into the nips along the pairs of knives 84 which are secured through their respective hubs 86 to the powered arbors 4 and 6. Moreover, the hydraulic motors 72 are energized and they turn the arbors 4 and 6 so that knives 84 on those arbors rotate toward the nips on that side of the machine A which is presented toward the feeding apparatus D and of course rotate away from the nips on the opposite discharge side. The metal sheet is forced into the nips formed by the knives 84 on the upper and lower arbors 4 and 6, and at each pair of knives 84, the upper knife 84 forces the sheet s downwardly, whereas the lower knife 84 forces it upwardly. Since the active cutting edges 86 of the two knives 12 are quite close together, the sheet s is sheared at the small axial clearance between them, thus creating a slit r. While the knives 84 in forming a slit r deflect the metal of the sheet s upwardly and downwardly, the stripper blades 132 counteract this deflection and direct the metal out of the machine A with the segments on each side of the slit r generally at the same elevation. Moreover, the alternating left and right configurations of the pairs of knives 84, further counteracts the tendency of the segments t to twist upon emerging from the knives 12. Of course, the number of slits r depends on the number of knives 84, there being a separate slit r formed at each pair of knives 84.

The slits r may be formed quite close together, for the stabilizing bosses 114 on the hub 86 of one cutter 12 will fit into the cavities 116 between the stabilizing bosses 114 on the hub 86 of the adjacent cutter 12, provided of course that the cutters 12 are in the correct angular orientation with respect to each other. Nevertheless, the hubs 6 provide a large measure of stability for the knives 84 by reason of the bosses 114, even on the arbors 4 and 6 which are of relatively small diameter.

As the arbors 4 and 6 turn, their free ends, that is the ends remote from the hydraulic motors 72 are confined by the much shorter and more rigid storage arbors 8 and 10. Additional stability is acquired from the carriages 14, for the back up rollers 130 in them bear against the cylindrical outer surfaces 87 of the knives 84 and transmit the spreading force imparted by the metal sheet s to the tracks 36 and 40 and the beams 20 and 22 which back them. Thus, the arbors 4 and 6, notwithstanding their reduced diameter, undergo very little deflection, and certainly not enough deflection to affect the quality of the slits r.

In time the cutting edges 92 of at least some of the knives 84 will become dull and the cutters 12 on which these knives are carried must be removed from the machine A for sharpening. To remove the cutters 12 of any pair, the screws which secure the clamping block 50 for the upper storage arbor 8 and the screws 75 which secure the clamping block 52 for the lower storage arbor 10 are backed off slightly so that the blocks 50 and 52 no longer tightly grip the arbors 8 and 10, respectively. Then an impact wrench or other turning device is applied to the ends of bolts 78 which project from the arbors 8 and 10 and they are turned enough to retract the storage arbors 8 and 10 from the aligned powered arbors 4 and 6. As the storage arbors 8 and 10 retract, the radial bearing 76 at their ends move off of the spindles 62 at the ends of the powered arbors 4 and 6. Indeed, the two storage arbors 8 and 10 are backed far enough off of their respective powered arbors 4 and 6 to enable the hub 86 of a cutter 12 to pass between the separated ends of the upper arbors 4 and 8 or the lower arbors 6 and 10. Thus, the cutters 12 may be moved to the space between the separated upper arbors 4 and 8 or the separated lower arbors 6 and 10 and lifted out of their carriages 14 and removed from the machine A.

Once the knives 84 are sharpened, the cutters 12 on which they are carried are replaced using merely a reverse sequence of steps.

ALTERNATE EMBODIMENTS

Figure 11:
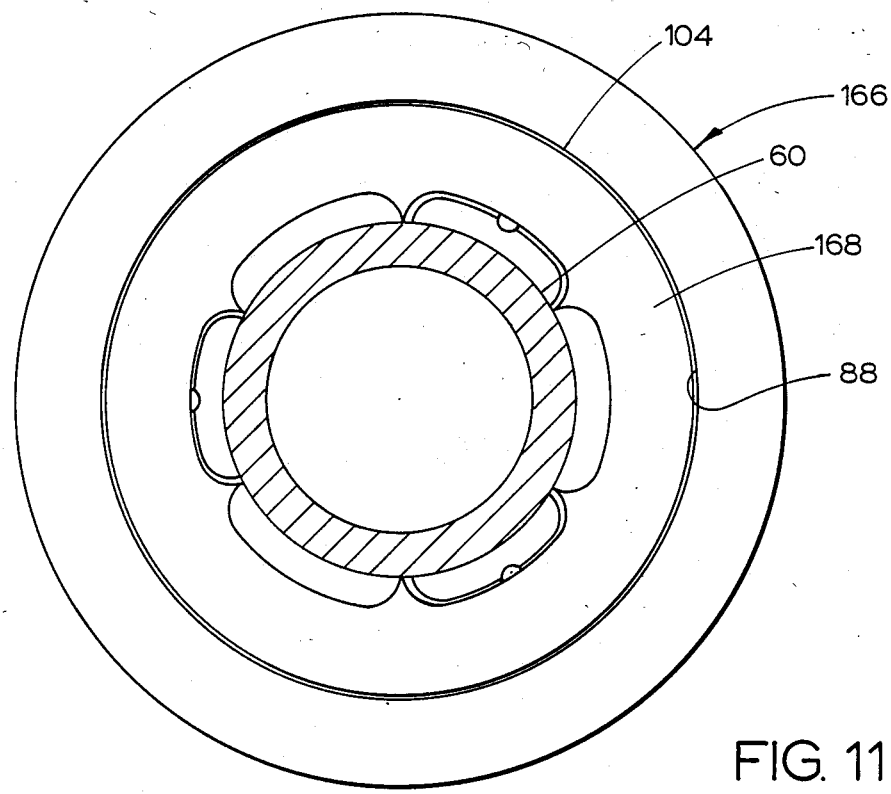
FIG. 11 is a sectional view of a modified arbor with a modified cutter positioned upon it.

Instead of the powered arbors 4 and 6 which are solid in cross-section, the machine A may have upper and lower powered arbors 160 (FIG. 11) which are hollow throughout most of their length, but are closed at their free ends, that is the ends from which the spindles 62 project. At their opposite ends the hollow arbors 160 are fitted with rotary couplings which are connected by means of flexible hoses to a source of hydraulic fluid, such as a pump. Like the arbors 4 and 6, the outside cylindrical surfaces 60 of the arbors 160 are finely machined to a truly cylindrical configuration, and this is best achieved by grinding on centers. Furthermore, a thin coating of chromium should be deposited on it. The outside diameter of each arbor 160 is preferably about 5 inches, while the inside diameter is about 4.5 inches.

The hollow arbors 160 support cutters 166 which differ from the cutters 12 in that each has a hub 168 that is continuous throughout its circumference, that is to say it does not have the radial slit 98 of the hub 86, nor does it have the machine screw 118, hole 120 or retaining plate 122 which serve to expand and contract the hub 86. Indeed, the inner surface 96 of the hub 168 is cylindrical and of essentially constant diameter which is about 0.0002 inches greater than the diameter of the outer surfaces 60 for the hollow arbors 160. The modified hub 168 also lacks the oblique holes 112 and set screws 110 of the hub 86, the ring-like knife 84 being instead retained on the seating surface 104 of the hub 168 by a shrink fit which is acquired by heating the knife 86.prior to placing it over the hub 168.

To secure the cutter 166 and of course its knife 84 on it to the arbor 160 on which it is carried, the pressure of the hydraulic fluid within the hollow arbor 160 is merely increased. This expands the arbor 160 and causes it to bear tightly against the cylindrical inner surface 96 of the hub 168 for that cutter 166. Thus, when loading and positioning knives 84 on the arbors 160, the fluid within the hollow interiors of the arbors 160 is not under pressure. However, when the machine A slits metal sheet s, the arbors 160 must be pressurized to prevent the hubs 168 and knives 12 from slipping on them.

Figure 12:
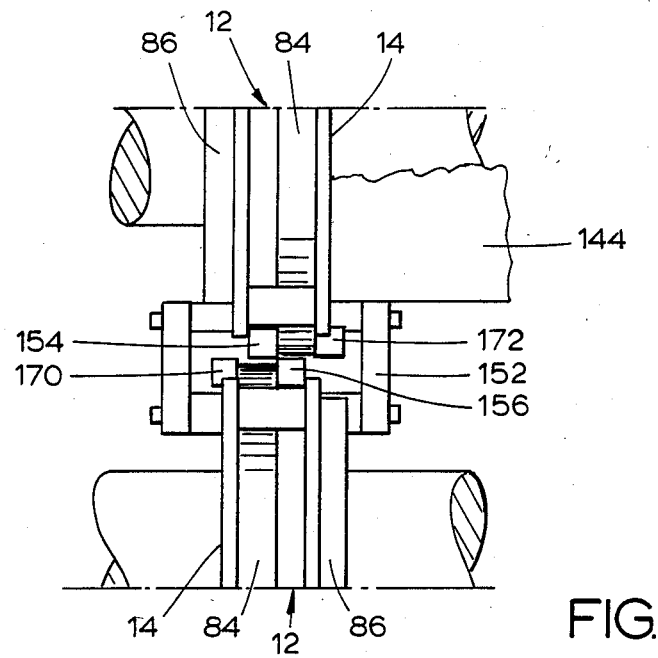
FIG. 12 is a side elevational view of a modified positioning unit.

The positioning unit 16 may be modified slightly to provide it with the capability of actually retrieving pairs of knives 12 from the storage arbors 8 and 10 and moving them to their proper locations on the powered arbors 4 and 6. To this end, each locator housing 150 and 152, in addition to having upper and lower stops 154 and 156, also has fingers 170 and 172 (FIG. 12) which retract and project from the housings 150 and 152 on each side of the stops 154 and 156. The spacing between the finger 170 and the upper stop 154 equals the width of a knife 84, that is the space between its two cutting edges 92, and likewise the spacing between the finger 172 and the lower stop 156 equals the thickness of a knife 84.

The motor 140 by rotating the lead screw 142 brings the carriage 144 to a position where the locator housing 150 or 152 with stops 154 and 156 corresponding in configuration to a pair of knives 84 exists. The stops 154 and 156 thereof extend as do the fingers 170 and 172 to the sides of them. Indeed, the fingers 170 and 172 project along the outer end faces 90 of the two knives 84 so that the knives 12 are captured between the fingers 170 and 172. The stops 154 and 156, on the other hand, project along the inner end faces 90 of the knives 84 and maintain the proper spacing between the cutting edges 92 of the knives 84. With the pair of knives 84 so captured, the hydraulic motor 140 is again energized, and by rotating the lead screw 142, it moves the carriage 14 and along with it, the knives 84 that are captured between the extended fingers 170 and 172. By motoring the rotation of the lead screw 142, the control device controls the motor 140 and terminates the rotation when it senses that the knives 84 of the captured pair are at the locations required for the scheduled slitting operation. At this time the stops 150 and 152 and the fingers 170 and 172 retract and the carriage 144 retrieves or repositions another pair of knives 84.

When the appropriate complement of knives 84 is on the two hollow arbors 160, all at the proper locations, the arbors 160 are pressurized, so that they expand against the inside surfaces of the hubs 166 and thereby secure the hubs 166 as well as the knives 12 on them firmly in place.

In lieu of controlling the spacing between the arbors 4 and 6 with the camming bars 28 and 30 and the cylinders 38, one of the beams 20 or 22, preferably the latter, may be carried on jack screws which when turned move that beam upwardly and downwardly along the posts 24 of the frame 2. Of course, to maintain longitudinal and lateral stability, the posts 24 would be provided with inwardly presented ways, while the movable lower beam 22 would have slides or grids which conform in configuration to the ways so as to permit only vertical motion. The lead screws would extend through nuts on the lower beam 22 and all would be turned in unison by a single motor. Moreover, the upper tracks 36 would be attached directly to the upper beam 20, just as the lower tracks 40 are attached directly to the lower beam 22.

This invention is intended to cover all changes and modifications of the example of the invention herein chosen for purposes of the disclosure which do not constitute departures from the spirit and scope of the invention.

What is claimed is:

1. A machine for slitting metal sheet, said machine comprising: a frame; first and second arbors mounted on the frame for rotation about parallel axes; means for rotating the arbors; a first disk-like knife mounted on the first arbor and a second disk-like knife mounted on the second arbor, the knives being offset axially with respect to each other, yet normally being close enough together, both axially and radially, to create a nip through which the metal sheet passes to be sheared, the knives further being releasable from and movable axially along their respective arbors so that they can be located in different axial positions on those arbors; first back-up means on the frame for bearing against that portion of the first knife which is remote from the nip, the first back-up means being capable of accommodating the movement of the first knife along the first arbor so as to bear against the first knife at varying axial positions of the knife along the first arbor; second back-up means for bearing against that portion of the second knife which is remote from the nip, the second back-up means being capable of accommodating the movement of the second knife along the second arbor so as to bear against the second knife at varying axial positions of that knife along the second arbor, whereby the back-up means prevent the arbors from deflecting appreciably when the metal sheet passes between and is sheared by the knives.

2. A machine according to claim 1 wherein the frame has first and second ways which are spaced apart and parallel; wherein the first and second arbors are located between the first and second ways with their axes being parallel to the ways; and wherein the first back-up means comprises a first carriage movable along the first way and having a surface which bears against the first knife remote from the nip, and the second back-up means comprises a second carriage movable along the second way and having a surface which bears against the second knife remote from the nip, whereby by the spreading forces that are applied to the arbors by the sheet metal are transferred to the frame through the carriages.

3. A machine according to claim 2 wherein each carriage has two back-up rollers which rotate on the carriage and are arranged to generally form a cradle for the knife against which they bear, and the surfaces which bear against the knives remote from the nip are on the back-up rollers.

4. A machine according to claim 2 wherein the frame includes posts and horizontal spaced apart beams on the posts, and wherein the ways are on the beams.

5. A machine according to claim 2 wherein the knives when in use for slitting the metal sheet are mounted firmly on their respective arbors, but when not in use, may be released from their arbors to slide along them; and wherein the knives are captured in the carriages so that when one of the knives slides along its arbor, the carriage in which that knife is captured moves along its ways on the frame.

6. A machine according to claim 1 wherein the knives when in use for slitting the metal sheet are mounted firmly on their respective arbors, but may be released from their arbors to slide along them; and further comprising a first storage arbor aligned axially with the first powered arbor so that the first knife may be moved from the first powered arbor to the first storage arbor and vice-versa; a second storage aligned axially with the second powered arbor so that the second knife may be moved from the second powered arbor to the second storage arbor and vice-versa; and means for retracting the first and second storage arbors from the first and second powered arbors a distance sufficient to enable the knives to be removed from the arbors in the spaces created between the storage and powered arbors.

7. A machine according to claim 6 and further positioning means for gripping the knives and moving the knives between the powered and storage arbors.

8. A machine according to claim 2 wherein each carriage further carries a stripper blade which extends away from the region of overlap and directs the slit metal sheet emerging from the knives generally away from the axes for the arbors.

9. A machine for slitting metal sheet, said machine comprising: a frame; first and second powered arbors mounted on the frame for rotation about parallel axes; means coupled to the first and second arbors for rotating the first and second arbors; a first knife on the first arbor and a second knife on the second arbor, the knives being secured to their respective arbors when the arbors turn to slit the metal sheet, but being releasable from their arbors so that they can slide along their arbors; a first storage arbor mounted on the frame where it aligns axially with and normally extends to the first powered arbor, the first storage arbor being the same cross-sectional size and configuration as the first powered arbor so that the first knife can slide onto the first storage arbor, the first storage arbor normally being connected with the end of the first powered arbor to provide radial support for the first powered arbor, but being capable of separating from the first powered arbor so that knives can be removed from the first arbors in the space between the first arbors; and a second storage arbor mounted on the frame where it aligns axially with and normally extends to the second powered arbor, the second storage arbor being the same cross-sectional size and configuration as the second powered arbor so that the second knife can slide onto the second storage arbor, the second storage arbor normally being connected with the end of the second powered arbor to provide radial support for the second powered arbor, but being capable of separating from the second powered arbor so that knives can be removed from the second arbors in the space between the second arbors.

10. A machine according to claim 9 wherein the storage arbors are normally carried in a fixed position on the frame.

11. A machine according to claim 10 wherein the frame comprises first and second beams and posts supporting the beams, with the posts being at the ends of the powered arbors, the first powered and storage arbors being carried on the first beam and the second powered and storage arbors being carried on the second beam.

12. A machine according to claim 9 and further comprising means for moving the aligned first powered and storage arbors toward and away from the aligned second powered and storage arbors.

13. A machine according to claim 9 wherein the knives are carried on hubs which fit around the arbors.

14. A machine according to claim 13 wherein each hub includes means for contracting it circumferentially to enable it to be secured to the arbor on which it is mounted.

15. A machine according to claim 13 wherein the powered arbors are hollow and contain a hydraulic fluid; and further comprising means for pressurizing the fluid enough to expand the powered arbors and secure the hubs on them.

16. In a machine for slitting metal sheet and including a powered arbor which rotates about an axis of rotation and has an external surface, the improvement comprising: at least two hubs mounted on the arbor around the external surface thereof, each hub having an inside surface which conforms to the configuration of and is against the external surface of the arbor and a plurality of axially directed bosses along which the inside surface extends, the plurality of bosses on each hub projecting toward the other hub, the bosses of the hubs being narrow enough and spaced such that the bosses of the one hub will fit between the bosses of the other hub, whereby each hub has a wide stance, yet the hubs may be brought close together; and an annular knife attached to and encircling each hub.

17. The improvement according to claim 16 wherein the inside surface is cylindrical.

18. The improvement according to claim 17 wherein each hub has cavities opening axially out of it between its bosses so that the bosses on each hub will fit into the cavities in the other hub.

19. The improvement according to claim 16 wherein each hub contains a radially directed slit; and further comprising a machine screw extended across the slit and being threaded into the hub on one side of the slit so that when the screw is turned down, the hub will contract and tightly grip the arbor.

20. The improvement according to claim 19 wherein the machine screw in each hub has a head located on the side of the slit opposite to the side where the screw is threaded into the hub; and further comprising a retaining plate extending partially over the head of the machine screw so that when the screw is backed off, it causes the hub to spread at the slit and expand.

21. The improvement according to claim 17 wherein each hub is continuous about its inside surface, and the arbor is hollow and contains a fluid, the fit between each hub and the arbor being such that when the fluid in the arbor is at ambient pressure, the hub will slide over the arbor, but when the pressure is increased substantially, the arbor will expand against the inside surface of the hub and secure the hub.

22. A machine for slitting metal sheet, said machine comprising: a frame including first and second spaced apart beams; first and second arbors located in the space between the beams for rotation about axes that are parallel, means for rotating the arbors; first and second annular knives located on the first and second arbors, respectively, with each knife having a side face and a cutting edge, the knives being close enough together, both axially and radially to create a nip through which metal passes to be slit, the knives being capable of sliding over their respective arbors when not otherwise restrained; a lead screw extended along the frame parallel to the axes of the arbors; a motor for turning the lead screw in both directions of rotation; a carriage connected to the lead screw so that it moves along the lead screw when the lead screw turns; stops mounted on the carriage and being movable, generally perpendicular to the direction of movement along the lead screw, between extended and retracted positions, the stops when extended being capable of locating the region of the nip between the knives so the knives along their side faces may be brought into contact with the stops to properly locate the knives with respect to each other and with respect to their arbors; and means for monitoring the rotation of the lead screw to ascertain the precise location of the carriage and its stops along the arbors.

23. A machine according to claim 22 and further comprising fingers located to the sides of the stops for capturing a pair of first and second knives and moving them along the arbor as the carriage moves.

24. A machine for slitting metal sheet, said machine having spaced apart first and second beams and spaced apart first and second connecting members which are extended between the beams, all to form an opening through which the metal sheet passes with the connecting members being presented toward the edges of the sheet; first and second powered arbors mounted on the frame for rotation about parallel axes generally in the opening between the beams; means coupled to the first and second arbors for rotating the first and second arbors; a first knife on the first arbor and a second knife on the second arbor, the knives being secured to their respective arbors when the arbors turn to slit the metal sheet, but being releasable from their arbors so that they can slide along their arbors; a first storage arbor located on the frame generally beyond the opening and being aligned axially with and normally extended to the first powered arbor in the region of the second connecting members, the first storage arbor being the same cross-sectional size and configuration as the first powered arbor so that the first knife can slide onto the first storage arbor; and a second storage arbor located on the frame generally beyond the opening and being aligned axially with and normally extended to the second powered arbor, the second storage arbor being the same cross-sectional size and configuration as the second powered arbor so that the second knife can slide onto the second storage arbor; and first and second backing means for transferring a spreading force exerted on the arbors by the knives to the beams in the region of the opening so that the beams resist the spreading force in the region of the opening.

25. A machine according to claim 24 wherein the first backing means is interposed between the first knife and the first beam within the opening and second backing means interposed between the second knife and the second beam within the opening.

26. A machine according to claim 25 wherein the first knife and first backing means are united such that they move through the opening in unison, and the second knife and second backing means are united such that they move through the opening in unison.

27. The improvement according to claim 16 wherein each hub has a plurality of bosses on each of its sides.

28. The improvement according to claim 27 wherein each hub has cavities opening axially out of it on each of its sides, with the cavities being between the bosses, so that the bosses on an adjacent hub will fit into the cavities.

29. A machine according to claim 22 wherein each knife is secured to a hub which in turn fits around the arbor on which the knife is mounted; wherein the arbor is hollow and contains a fluid; wherein the fit between the hub and its arbor is such that when the fluid in the arbor is at ambient pressure, the hub will slide over the arbor, but when the pressure is increased substantially, the arbor will expand against the hub and secure the hub.

30. A machine for slitting metal sheet, said machine comprising a frame having spaced apart beams which carry ways; first and second powered arbors mounted on the frame in the space between the beams for rotation about parallel axes that are parallel to the ways on the beams; a first knife on the first arbor and being movable axially along the first arbor; a second knife on the second arbor and being movable axially along the second arbor; first backing means interposed between the ways of the first beam and the first knife for transferring to the first beam a spreading force applied to the first arbor at the knives thereon, so that the first beam resists the spreading force, the first backing means being movable along the ways of the first beam and capturing the first knife such that the first knife and first backing means move in unison along the first arbor and first beam, respectively; and second backing means interposed between the ways of the second beam and second knife for transferring to the second beam a spreading force applied to the second arbor at the knife thereon so that the second beam resists that spreading force, the second backing means being movable along the ways of the second beam and capturing the second knife such that the second knife and second backing means move in unison along the second arbor and second beam, respectively.

31. A machine according to claim 30 wherein the first and second backing means each carry a stripper blade which is positioned such that it will deflect the metal strip as the strip emerges from a nip between the first and second knives, thus preventing the strip from acquiring an excessive twist.

32. A machine according to claim 30 wherein each of the backing means includes a pair of rollers which cradle the knife captured in that backing means and serve to transfer the spreading force from the knife to the beam along which the backing means move.

* * * * *